United States Patent
Bean et al.

(10) Patent No.: US 11,853,418 B2
(45) Date of Patent: Dec. 26, 2023

(54) SYSTEM AND METHOD FOR NEURAL NETWORK BASED DETECTION OF CYBER INTRUSION VIA MODE-SPECIFIC SYSTEM TEMPLATES

(71) Applicant: Rockwell Collins, Inc., Cedar Rapids, IA (US)

(72) Inventors: Reginald D. Bean, Center Point, IA (US); Gregory W. Rice, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 201 days.

(21) Appl. No.: 17/464,159

(22) Filed: Sep. 1, 2021

(65) Prior Publication Data

US 2023/0068909 A1  Mar. 2, 2023

(51) Int. Cl.
*G06F 21/55* (2013.01)
(52) U.S. Cl.
CPC ...... *G06F 21/554* (2013.01); *G06F 2221/034* (2013.01)
(58) Field of Classification Search
CPC . G06F 21/554; G06F 2221/034; G06F 21/566
See application file for complete search history.

(56) References Cited

U.S. PATENT DOCUMENTS

| | | | | |
|---|---|---|---|---|
| 8,918,866 B2* | 12/2014 | Luo | ................... | H04L 63/1441 726/22 |
| 10,581,874 B1* | 3/2020 | Khalid | ................ | H04L 63/1425 |
| 11,201,893 B2* | 12/2021 | Kruse | ................... | G06F 21/552 |
| 11,227,047 B1* | 1/2022 | Vashisht | ................ | G06F 21/56 |
| 2018/0248905 A1 | 8/2018 | Côte et al. | | |
| 2019/0379683 A1 | 12/2019 | Overby et al. | | |
| 2019/0394215 A1 | 12/2019 | Lee et al. | | |
| 2020/0104498 A1 | 4/2020 | Smith et al. | | |
| 2020/0280573 A1 | 9/2020 | Johnson et al. | | |
| 2020/0322362 A1 | 10/2020 | Park et al. | | |
| 2020/0374298 A1 | 11/2020 | Sirianni et al. | | |
| 2020/0389470 A1 | 12/2020 | Kursun | | |
| 2021/0034737 A1* | 2/2021 | Khan | ................... | G06F 21/554 |
| 2021/0044604 A1 | 2/2021 | Annen et al. | | |

(Continued)

*Primary Examiner* — Christopher A Revak
(74) *Attorney, Agent, or Firm* — Suiter Swantz pc llo

(57) ABSTRACT

A system and method for detecting and preventing cyber-intrusion of a protected system incorporates neural networks having a training mode and a host-accessible (e.g., non-training) mode. When in training mode, the neural networks observe data exchanges with a protected system via interfaces (based on test inputs) and generate system templates corresponding to observed normal behaviors of the interfaces (including "gold standard" behavior indicative of optimal performance behaviors and/or minimal threat of cyberintrusion). When in host-accessible mode, the neural networks observe operating behaviors of the interfaces for each exchange via the interfaces and apply stored system templates to the system data to most closely approximate the optimal behavior set. If the divergence between the best-fit system template and the applied best-fit system template is sufficient to indicate anomalous behavior and a potential risk of cyberintrusion or cyberattack, an event monitor takes corrective action to prevent a cyberintrusion.

15 Claims, 5 Drawing Sheets

(56) References Cited

U.S. PATENT DOCUMENTS

| | | |
|---|---|---|
| 2021/0058415 A1 | 2/2021 | Sanzgiri et al. |
| 2021/0194907 A1* | 6/2021 | Bertiger .............. H04L 43/0811 |
| 2021/0319099 A1* | 10/2021 | Gaddam ............. H04L 63/1408 |
| 2022/0329608 A1* | 10/2022 | Liu ..................... H04L 63/1441 |
| 2023/0054582 A1* | 2/2023 | Kishimoto ............. G06N 20/00 |
| 2023/0177152 A1* | 6/2023 | Lee ....................... G06F 21/554 |
| | | 726/23 |

* cited by examiner

SYSTEM AND METHOD FOR NEURAL NETWORK BASED DETECTION OF CYBER INTRUSION VIA MODE-SPECIFIC SYSTEM TEMPLATES

BACKGROUND

Current state-of-the-art systems leverage a variety of open system architectures, commercial-off-the-shelf (COTS) hardware and software components, third-party components, operating systems that may not have a high or sufficient degree of pedigree in cyber-protection mechanisms, and internally developed solutions that may be susceptible to cyber-attack events. For example, access-sensitive information and technology may be exfiltrated through such vulnerable "back doors." Similarly, denial-of-service attacks may prevent the target system from providing its intended services. Further, targeted systems may be maliciously modified to perform unintended operations. As platforms migrate to state-of-the-art components and open system architectures (e.g., Future Airborne Capability Environment (FACE) and Open Mission Systems (OMS), as a few military-oriented examples) the continued use of COTS components, third-party components, and components otherwise lacking cyber-protection mechanisms leaves these systems and platforms open to cyber-attack on multiple fronts.

The FACE environment, for example, allows third party applications to be interoperable through a transport layer that provides both application interconnectivity and access to system services. Through this transport layer, it is feasible that a COTS application with hidden malware (or alternatively an application lacking cyber-protection mechanisms) could extract sensitive information from other applications throughout the environment and exfiltrate this information via communication with a third party. This would allow an external party to compromise the system through the compromised application; loss of sensitive information, and even loss of command and control over the environment, could result.

SUMMARY

In a first aspect, a template-based cyberintrusion detector for preventing cyberattacks on a protected system or processing environment is disclosed. In embodiments, the cyberintrusion detector is configured to run on security processors within a protected processing environment (or between the protected processing environment and external data sources) and includes neural networks for (e.g., when in training mode) generating test inputs for simulated data exchanges between the protected system and the external data sources via interfaces (e.g., ports, transport layers, or other potential channels for cyberintrusion). The neural networks observe training-mode behaviors of the interfaces based on exchanges of the test inputs, according to data assessment parameters and/or operational modes of the protected system. Training-mode behaviors may include "gold standard" or optimal behavior sets indicative of optimal performance of the interface (e.g., with respect to a particular test input and/or operational mode) and therefore of minimal threat of cyberintrusion via the interface. The neural networks generate system profiles, or system templates, based on these observed training-mode behaviors and store the system templates to memory accessible to the cyberintrusion detector. When not in training mode (e.g., real-time operating mode, host-accessible mode), the neural networks monitor system data exchanged between the protected system and external data sources via the interfaces. For each exchanged set of system data, the neural networks apply system templates to replicate, or approximate, the "gold standard" behavior for a particular interface (e.g., based on a particular operational mode and as applied to the exchanged set or sets of system data). A determined best-fit behavior set most closely approximating optimal behavior of the interface is achieved by applying a best-fit system template of the stored system templates. For each determined best-fit behavior set, the neural networks determine the best-fit error, or divergence between the best-fit behavior set and the applied best-fit system template. If the determined divergence is sufficiently large to meet or exceed policy thresholds for abnormal or anomalous behavior, an event monitor in communication with the neural networks may take additional preventative or corrective action based on system policies.

In some embodiments, assessment parameters include system data labels, data destination addresses, data exchange periodicities, and/or dependencies of external data sources.

In some embodiments, the assessment parameters are associated with target or threshold values (e.g., which may depend on the current operational mode or a desired level of protection).

In some embodiments, the preventative or corrective actions available to the event monitor include isolating a particular set or sets of system data; isolating an interface associated with abnormal or anomalous behavior from the protected system; and/or isolating the protective system or selected components thereof from the interface.

In some embodiments, the cyberintrusion detector and protected system are embodied in a vehicle or other mobile platform, and the operational mode includes an operational mode of the mobile platform (e.g., a flight segment).

In some embodiments, the observed training-mode behaviors, and the determination of best-fit behavior sets, may be at least partially based on observed system metadata (e.g., comparisons of training-mode and accessible-mode metadata).

In some embodiments, system metadata includes mission parameters, system messages received from trusted sources within the protected processing environment, user or operator data, and/or sensors providing data to the protected processing environment.

In some embodiments, determining the divergence of the best-fit behavior sets from the best-fit stored system template includes comparing the best-fit behavior sets to stored policy behaviors corresponding to the best-fit system template.

In a further aspect, a method for detecting and preventing cyberintrusion of a protected system is also disclosed. In embodiments, the method includes generating, via neural networks running on security processors, test inputs for data exchanges between the protected system and external data sources via the interfaces connecting the two and providing channels for potential cyberintrusion. The method includes observing, via the neural networks, training-mode behaviors of the interfaces during the simulated data exchanges, the observed training behavior sets based on assessment parameters for the exchanged test inputs and/or operational modes of the protected system. The observed training-mode behaviors include "gold standard" behaviors or optimal behaviors of the interfaces (and therefore indicative of minimal thread of cyberintrusion via a particular interface). The method includes generating, via the neural networks, system templates or profiles based on the observed training-mode behaviors. The method includes storing the generated system templates to memory accessible to the neural networks. The method includes, in an accessible or non-training mode, monitoring exchanges of system data between the protected system and the external data sources via the interfaces. The method includes, for each exchanged set of system data, applying stored system templates to replicate, or approximate, the gold standard behavior for a given interface (e.g., based on a given operational mode or assessment parameters). The method includes determining, via the neural networks, a best-fit behavior set most closely approximating the gold standard behavior for a given interface and under a given set of conditions by applying a best-fit stored system template. The method includes determining, via the neural networks, a divergence or best-fit error between the best-fit behavior set and the best-fit stored system template. The method includes, when the determined divergence meets or exceeds thresholds for abnormal or anomalous behavior based on system policies, taking additional corrective action via an event monitor.

In some embodiments, assessment parameters include system data labels, data destination addresses, data exchange periodicities, and/or dependencies of external data sources.

In some embodiments, the assessment parameters are associated with target or threshold values (e.g., which may depend on the current operational mode or a desired level of protection).

In some embodiments, the method includes, via the event monitor, taking additional preventative or corrective actions including: isolating a particular set or sets of system data; isolating an interface associated with abnormal or anomalous behavior from the protected system; and/or isolating the protective system or selected components thereof from the interface.

In some embodiments, observing training-mode interface behaviors includes observing additional training-mode system metadata associated with a simulated data exchange, and determining the best-fit behavior set includes observing accessible-mode system metadata that may affect the choice of best-fit behavior set (e.g., based on a comparison of accessible-mode and training-mode metadata).

In some embodiments, system metadata includes mission parameters, system messages received from trusted sources within the protected processing environment, user or operator data, and/or sensors providing data to the protected processing environment.

In some embodiments, determining the divergence of the best-fit behavior sets from the best-fit stored system template includes comparing the best-fit behavior sets to stored policy behaviors corresponding to the best-fit system template.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
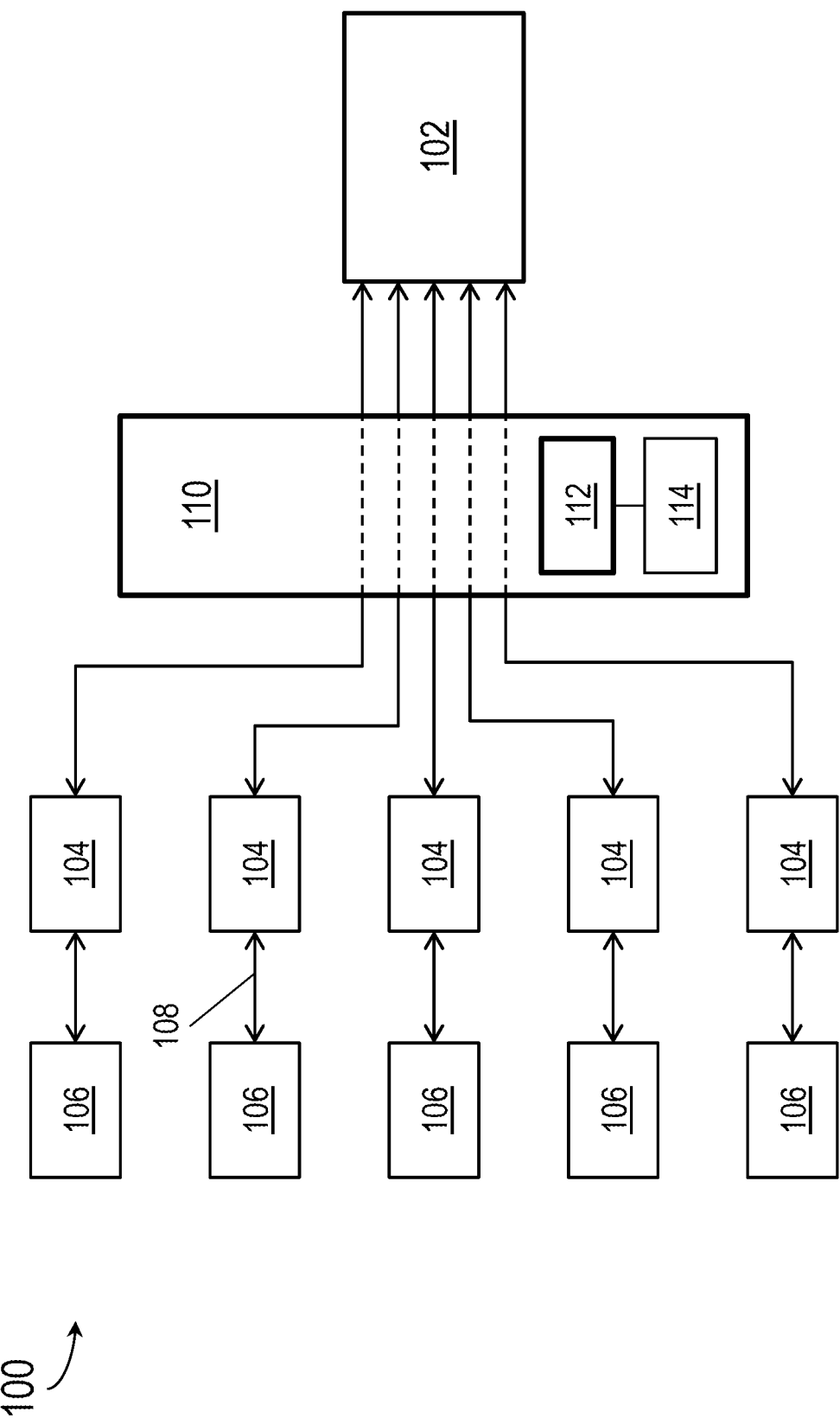
FIG. 1 is a block diagram illustrating a protected system and external interfaces according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a novel method and system for imposing a template-based cyberintrusion detector or "cyber guard" between a protected system (or a system to be protected) and any external interfaces at risk of providing a vulnerable portal into the system or platform. The "cyber guard" may incorporate neural networks trained via machine learning techniques to understand how specific interfaces should respond to a data exchange between the protected system and external data sources (which may be potential threats) and assess whether the interfaces are indeed responding as they should be under a given set of circumstances. Under normal operating conditions, anomalous behavior by an interface may be detected and any necessary corrective action taken according to system policies.

It is contemplated that the system may have numerous advantages. For example, potential cyber intrusions through external interfaces may be quickly detected at as deep or granular a level as may be desired. Intrusion detection can be fine-tuned to system modes to weed out false positives and false negatives, and the protected system can rapidly shut down the possibility of a cyber event by denying access to potential intruders.

Referring to FIG. 1, a processing environment 100 is disclosed. The processing environment 100 may include a protected system 102 and one or more interfaces 104 (e.g., Ethernet, USB, or other ports; transport layers providing interconnectivity with third party applications; external, contentious, or untrusted channels via which a cyberintrusion may occur) via which external data sources 106 (e.g., external systems or networks) may exchange data (108) with the protected system 102.

In embodiments, a template-based cyberintrusion detector 110 (e.g., "cyber guard") may be inserted between the interfaces 104 and the protected system 102. For example, the cyberintrusion detector 110 may monitor all data traffic 108 exchanged by the protected system 102 via the interfaces 104. The cyberintrusion detector 110 may further include an event monitor 112 defined by system security policies 114 of the protected system 102.

In embodiments, if the cyberintrusion detector 110 determines that any interface 104 is responding to a data exchange 108 in a sufficiently anomalous manner, the cyberintrusion detector may conclude that a cyber-attack is the cause of the anomalous behavior and direct the event monitor 112 to take corrective measures (e.g., as provided for by the system security policies 114) to prevent a cyber-attack on the protected system 102 by the anomalous interface.

Figure 2:
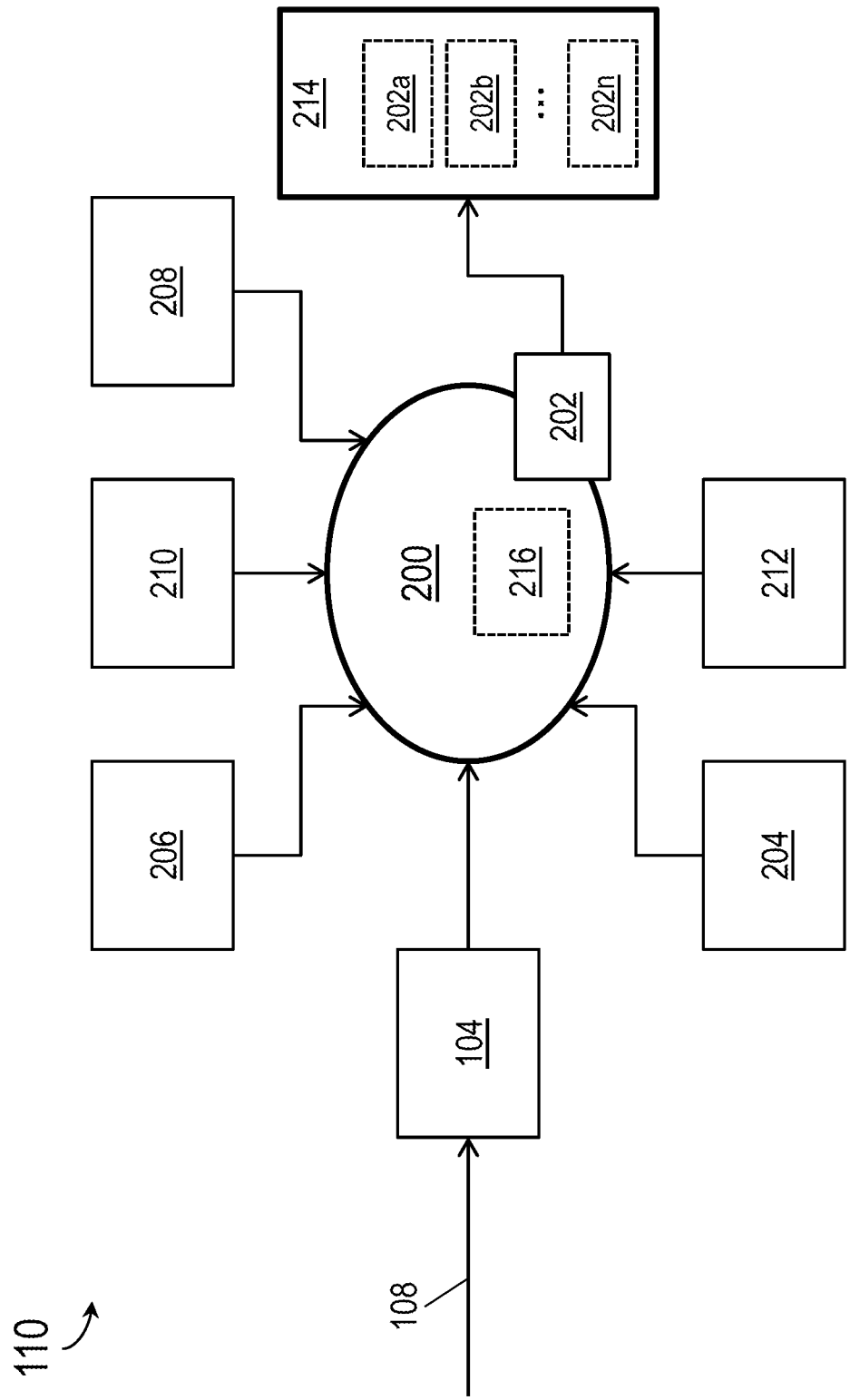
FIG. 2 is a block diagram illustrating a training mode of a cyber guard system according to example embodiments of this disclosure.

Referring to FIG. 2, the cyberintrusion detector 110 is shown. The cyberintrusion detector 110 may include neural networks 200, system templates 202, system messages 204, assessment parameters 206, parameters targets and thresholds 208, operational modes 210, system metadata 212, and memory 214.

In embodiments, the cyberintrusion detector 110 may include one or more neural networks 200 configured to operate in a training mode or in a host-accessible mode (e.g., a non-training mode; see FIG. 3, below). For example, while in training mode the neural networks 200 may be trained (via, e.g., machine learning, deep learning, cluster analysis, support vector machines, or any other appropriate supervised or semi-supervised learning techniques) under any applicable system situations, conditions, or circumstances to understand the behavior of each interface 104.

In embodiments, the neural networks 200 may be trained to observe the behaviors of a given interface 104 in response to a variety of potential data exchanges 108 under normal operating conditions. For example, the neural networks 200 may generate test inputs (e.g., some or all possible input data combinations based on assessment parameters 206, parameter targets and/or thresholds 208, and system messages 204) associated with a data exchange 108 and generate system templates 202 corresponding to observed training behaviors of the interface in response to the test inputs. System messages 204, for example, may include messages, commands, and/or instructions (e.g., dictating a mode of the processing environment 100 or a mode of operation as described below) received from a system computer or other generally trusted source which, while not external in the sense of the external interfaces 104, may still be vulnerable to cyberintrusion. These generated system templates 202 may include "gold standard" behavior sets corresponding to optimally normal or expected behaviors of the interface 104 indicative of a "best fit" of the interface to a given input dataset and set of assessment parameters (e.g., and therefore indicative of minimal threat of cyberintrusion or cyber-attack).

For example, assessment parameters 206 may include, but are not limited to, the following examples:

Label parameters may provide that all data exchanged via interfaces 104 conform to one or more protocols; for example, all data will include well-formed labels.

Data parameters may provide that any labeled data incorporates one or more parameters, e.g., maximum/minimum, binary fields having a limited or deterministic set of permutations.

Address parameters may provide that, for a given system protocol, any exchanged data may be routed to a limited number of destination addresses.

Timing parameters may provide that not all external data endpoints (e.g., external data sources 106, FIG. 1) exchanging data via the interface 104 may transmit or receive completely randomly; rather, some or all such data endpoints, but may instead each have learnable periodicities.

Sequencing parameters may provide that not all external data end-points exchanging data via the interface 104 may be randomly interleaved with other such external data sources; rather, some or all such data endpoints may instead each have learnable dependencies and/or interactions.

In embodiments, the neural networks 200 may incorporate parameter targets and thresholds 208 to determine the degree of divergence from a system template 202 (corresponding to a normal or expected behavior of the interface 104) indicative, e.g., when the cyberintrusion detector 110 is in operating mode, of anomalous behavior by the interface 104 that may indicate a potential cyber-attack and may warrant corrective or preventative action. For example, depending on the level of security desired (or the likely level of trust within the processing environment 100, or the likelihood of attach upon the protected system (102, FIG. 1)) with respect to a particular operational mode 210, parameter targets and thresholds 208 may be set with higher or lower bounds corresponding to laxer or stricter interpretation of anomalous behavior by the neural networks 200.

In embodiments, unlike prior approaches to anomaly detection system profiling, however, the neural network 200 may additionally while in training mode inform the generation of system templates 202 stored to memory 214 (e.g., N system templates 202a-n). For example, the establishment and usage of multiple system templates 202a-n (e.g., based on operational modes 210 of the protected system (102, FIG. 1)) enable the neural networks 200 to match observed training behaviors (or, in operational mode, divergent or anomalous behavior indicative of a possible cyber event) to an active operating mode or system metadata 212 corresponding to a particular data exchange 108. If the processing environment (100, FIG. 1) is embodied in a vehicle or mobile platform (e.g., airborne, waterborne, ground-based), the operational modes 210 may correspond to different operational modes of the mobile platform. For example, an aircraft may comprise multiple modes of operation, including but not limited to: power-up, standby, takeoff, climb, cruise, descent, manual landing, autolanding. Similarly, modes of operation may be distinguished based on hardware or software configurations; e.g., navigational data exchanges between a GNSS receiver alone vs. a GNSS receiver plus other navigational sensors (e.g., barometric altimeter, magnetometer, compass). While the expected behavior of a given interface 104 may vary enough among various operational modes 210 to significantly complicate any attempt to establish a "best-fit" behavior for a given input dataset and/or assessment parameters, the expected behavior of the interface may be consistent within a given operational mode. Accordingly, system profiles 202a-n may be established in memory 214 and may include, e.g., for a particular operational mode 210 and a particular data exchange 108, a "gold standard" 216 corresponding to an optimal behavior set, e.g., optimal performance by the interfaces 104 minimally indicative of cyberintrusion.

In some embodiments, system templates 202, 202a-n corresponding to each operational mode 210 may be further fine-tuned by the observation and application of system metadata by the neural networks 200. For example, the neural networks 200 may establish sub-modes within a given operational mode 210 or corresponding system template 202, 202a-n, each sub-mode based on system metadata 212 and including one or more system templates specific to the sub-mode. System metadata 212 may include, but is not limited to, mission parameters; specific environmental, vehicular, or mission events (e.g., an aircraft in an engine-out state); user or operator data (e.g., a given processing environment 100 may display different baseline training behaviors when under the control of different users); and/or additional sensor data (e.g., external weather or atmospheric conditions, other vehicular parameters).

In embodiments, once the neural networks 200 have been trained to generate sufficient system templates 202, 202a-n (e.g., corresponding to all acceptable operational modes 210 for each interface 104 and the processing environment (100, FIG. 1) generally), the cyberintrusion detector 110 may be deployed in host-accessible mode (e.g., non-training mode) for real-time cybersecurity operations. Host-accessible modes may include, e.g., normal operating modes, commanded test modes, maintenance modes, and more generally any non-training mode wherein the protected system 102 is at nonzero risk of cyberintrusion.

In some embodiments, the cyberintrusion detector 110 may be selectively re-deployed in training mode, e.g., to re-train the neural networks 200 based on new behaviors and/or new types of data exchanges 108 associated with, e.g., new configurations of the processing environment 100, new external data sources 106 (e.g., if new communications, sensor, and/or surveillance components are introduced or legacy components removed), and/or new mission parameters.

In embodiments, the cyberintrusion detector 110 may be deployed on dedicated security processing hardware (e.g., dedicated processors and/or dedicated memory 214 for storage of generated system templates 202, 202a-n), or the cyberintrusion detector may be incorporated into an existing security processing environment.

Figure 3:
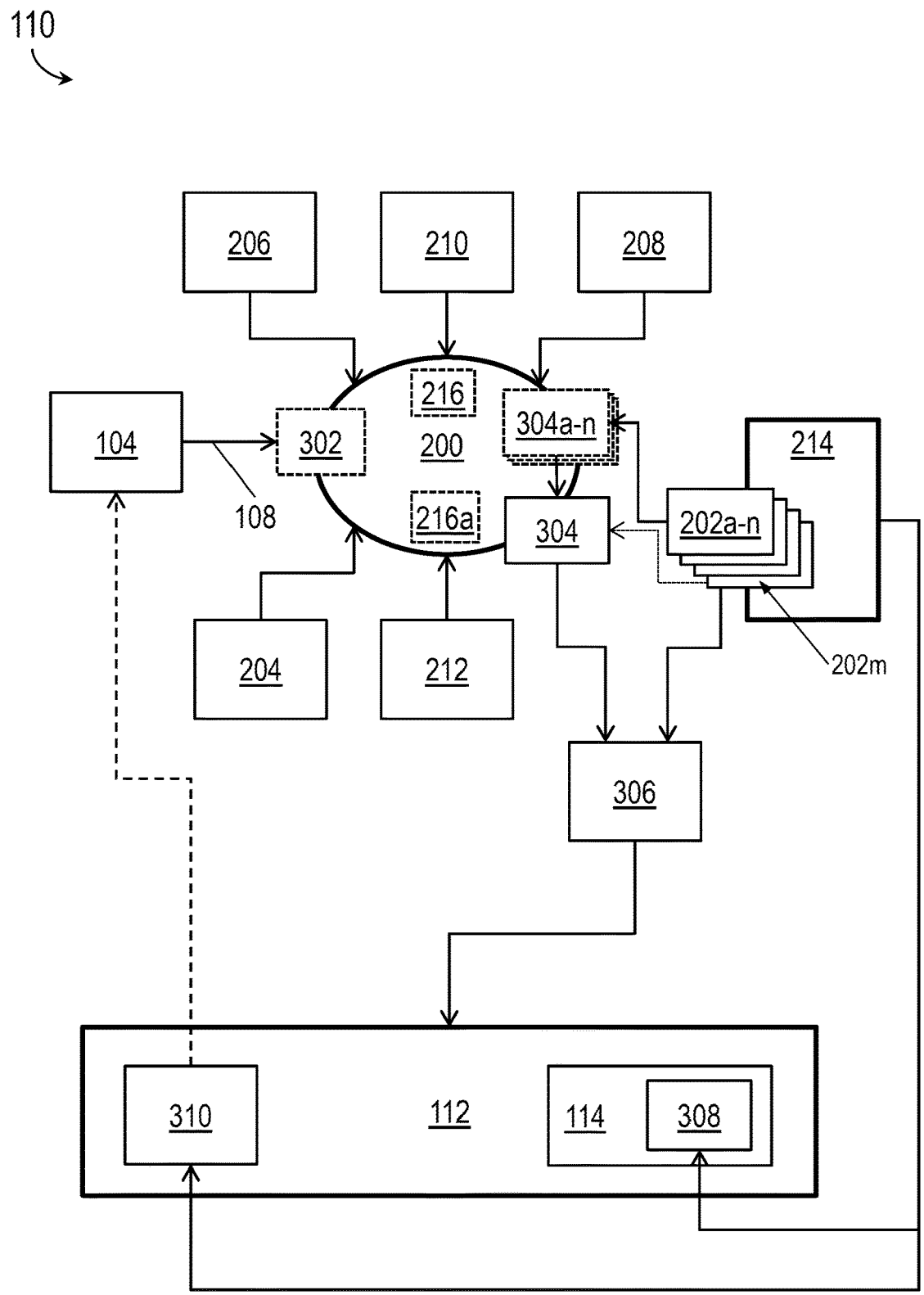
FIG. 3 is a block diagram illustrating an operational mode of the cyber guard system of FIG. 2.

Referring now to FIG. 3, the cyberintrusion detector 110 is shown in a host-accessible mode.

In embodiments, when in host-accessible mode the cyberintrusion detector 110 may perform real-time monitoring of each data exchange 108 between the protected system (102, FIG. 1) and all external data sources (106, FIG. 1) via each interface 104 configured for access to the protected system. For example, each data exchange 108 via the interfaces 104 may include one or more sets of inbound system data 302. In embodiments, the neural networks 200 may apply system templates 202a-n to the inbound system data 302 to assess operating behaviors of the interfaces 104 (in light of, e.g., received system messages 204, applicable assessment parameters 206 and targets/thresholds 208, current operational modes 210, and/or applicable system metadata 212) in order to determine whether, or to what extent, each outcome set 304a-n of operating behaviors (e.g., each behavioral set determined by applying a particular system template 202a-n to the system data 302) matches the "gold standard" 216 for optimal behavior by the interfaces (e.g., as applied to the system data 302, resulting in an optimal outcome set 216a). For example, if the variance or delta (Δ) between a given outcome set 304a (e.g., the set of operational behaviors of the interfaces 104 according to an applied system template 202a, as applied to the system data 302) and the optimal outcome set 216a falls outside predetermined parameters, the neural networks 200 may attempt to converge on a best-fit solution set 304 most closely matching or approximating the optimal outcome set 216a based on the "gold standard" optimal behavior set 216 by applying additional system templates 202b-n to the system data 302 to find the best-fit solution set within the resulting outcome sets 304b-n of system templates (the best-fit solution set 304 being the product of applying a best-fit system template 202m to the system data 302).

In some embodiments, the neural networks 200 may identify a single best-fit solution set 304 (e.g., the product of applying a best-fit stored system template 202m to the system data 302) most closely matching the optimal outcome set 216a based on the "gold standard" optimal behavioral set 216, or the neural networks may identify a hierarchy of potential solution sets (304a-n; based on system templates 202a-n) most closely matching the optimal outcome set 216a, e.g., ranked in order of best match.

In embodiments, (e.g., in light of any applicable parameter targets or thresholds 208), the neural networks 200 may determine a best-fit error 306 quantifying the magnitude by which the best-fit solution set 304 diverges from any policy behaviors specific to the best-fit system template 202m applied to the system data 302. For example, if the interfaces 104 are operating in an optimal fashion wherein the risk of a cyber-attack is minimal or negligible, as reflected by the best-fit solution set 304, the operating behavior of the interface may perfectly or near perfectly match the training behavior of the interface on which the solution set is based (e.g., the optimal outcome set 216a/"gold standard" optimal behavior set 216), in which case the best-fit error 306 may likewise be minimal or negligible (e.g., or even zero). If, however, the best possible outcome set (e.g., the best-fit solution set 304) achievable by applying the best-fit system template 202m to the system data 302 significantly deviates from policy behaviors for that system template, abnormal or anomalous behavior on the part of the interfaces 104 (and indicative of potential cyberintrusion or cyberattack) may be indicated, and may warrant further review and/or corrective action. In embodiments, while in non-training or accessible mode, any observed behaviors deviating from established or known assessment parameters (e.g., absent or ill-formed data labels; unknown or irregular destination addresses; deviations from established periodicities) may be interpreted by the neural networks 200 as indicative of abnormal or anomalous behavior on the part of the interfaces 104.

In embodiments, the cyberintrusion detector 110 may include an event monitor 112. For example, the event monitor 112 may maintain system security policies 114 for the processing environment (100, FIG. 1) and for subdivisions and components thereof (e.g., the protected system (102, FIG. 1)). System security policies 114 may include divergence thresholds 308 for the interfaces 104, the divergence thresholds defining what should be interpreted as anomalous or abnormal operating behavior by each interface. For example, divergence thresholds 308 may be set by system security policies 114 to minimize the detection of false positives or false negatives.

In embodiments, the event monitor 112 may compare the determined best-fit error 306 to any applicable divergence thresholds 308 (e.g., associated with the applied best-fit system template 202m) to determine whether the observed operating behavior of the interfaces 104 (e.g., as reflected by the best-fit solution set 304 most closely matching or approximating the "gold standard" optimal outcome set 216a) qualifies as sufficiently anomalous behavior as to indicate risk of cyberintrusion or cyber-attack via the interfaces. For example, in the event that the best-fit error 306 is of sufficient magnitude (e.g., sufficiently divergent), system security policies 114 may further provide for corrective action 310 to be taken by the event monitor 112. System security policies 114 and corrective actions 310 in response to anomalous behavior may be defined by the event monitor 112 (e.g., responsive actions may be defined for specific errors, or may be based in template policies associated with the applied best-fit system template 202m) and may be further based on a variety of factors including, but not limited to, the degree of divergence from the optimal outcome set 216a; the current operational mode 210; a desired level of risk tolerance (e.g., as reflected by the parameter targets and thresholds 208); the nature of the interfaces 104 and the associated risk of cyber-attack through those particular interfaces; and/or other system metadata 212 (e.g., mission parameters, user parameters). For example, in response to anomalous behavior, the event monitor 112 may isolate the associated data exchange 108 (or, e.g., system data 302 thereof) or external data source (106, FIG. 1), remove the connectivity of the associated interfaces 104, and/or isolate some other component or components within the processing environment 100 or protected system (102, FIG. 1).

Figure 4A:
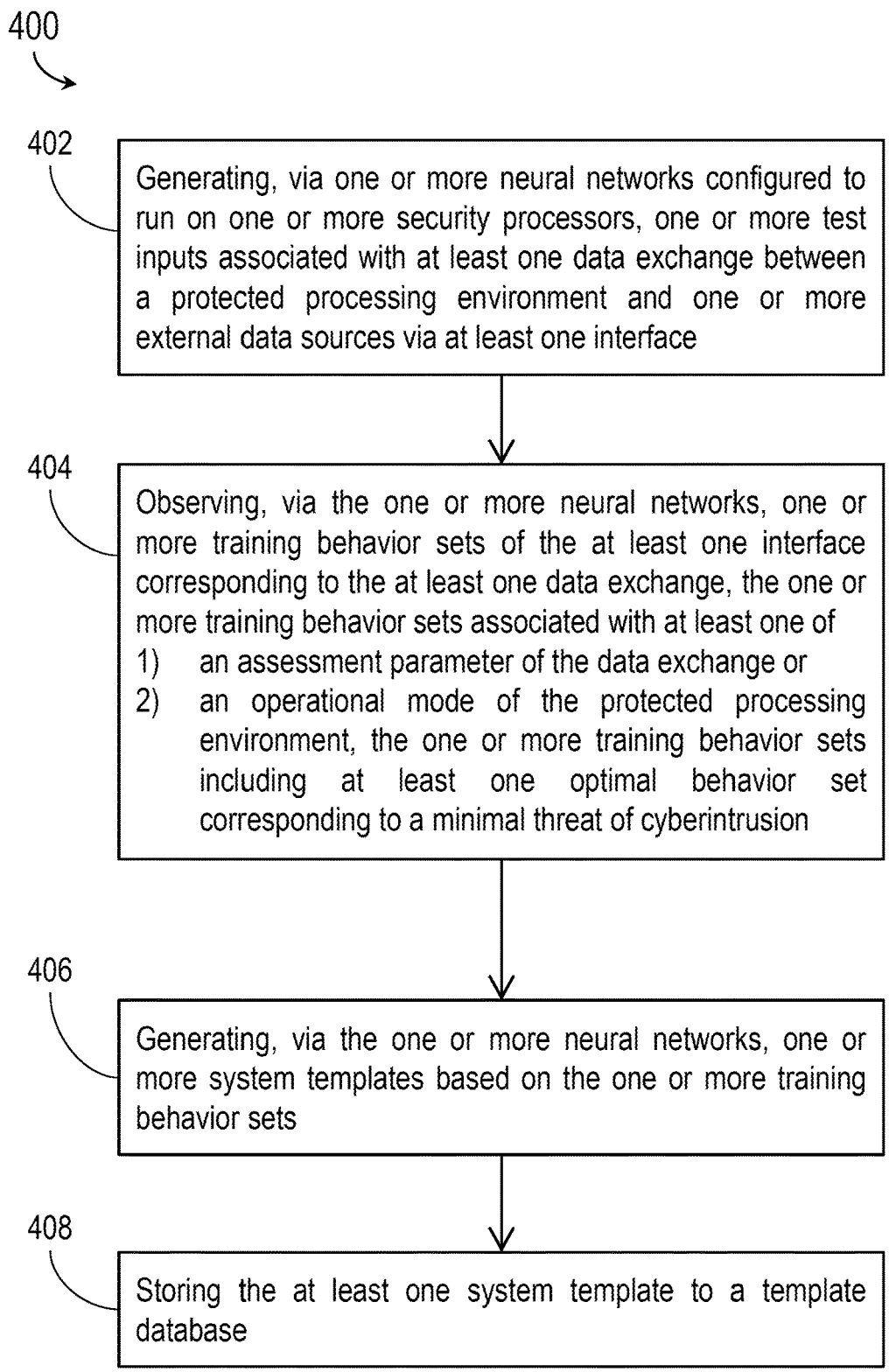
FIGS. 4A and 4B are flow diagrams illustrating a method for detecting a cyberintrusion of a protected system via external data interfaces according to example embodiments of this disclosure.

Referring to FIG. 4A, the method 400 may be implemented by the template-based cyberintrusion detector 110 and may include the following steps.

At a step 402, the neural networks of the cyberintrusion detector generate test inputs for simulated data exchanges between a protected system or processing environment and various external data sources via interfaces of the protected system (e.g., interfaces presenting potential vulnerabilities to cyberattack upon the protected system).

At a step 404, the neural networks (in training mode) observe the behavior of the interfaces in response to simulated exchanges of the test inputs between the external data sources and the protected system. For example, training mode behaviors may be based on assessment parameters for data exchanges (e.g., data labels, data destination addresses, exchange periodicities, or dependencies of particular sources) and/or a particular operational mode of the protected system. In some embodiments, the protected system is embodied in a mobile platform or vehicle and the operational mode of the protected system corresponds to an operational mode of the vehicle (e.g., takeoff, climb, cruise, descent, landing, and other flight segments or phases). The assessment parameters may further be associated with threshold or target values based on these operational modes. By observing training-mode behaviors of the interfaces, the neural networks may understand which behaviors constitute optimal or "gold standard" behavior sets, e.g., those interface behaviors indicative of normal behavior and therefore of minimal threat of cyberintrusion or cyber-attack.

At a step 406, the neural networks generate system templates (e.g., system profiles) of behavioral sets observed in training mode.

At a step 408, the neural networks store the generated system templates to memory accessible to the cyberintrusion detector (e.g., in a template database).

Figure 4B:
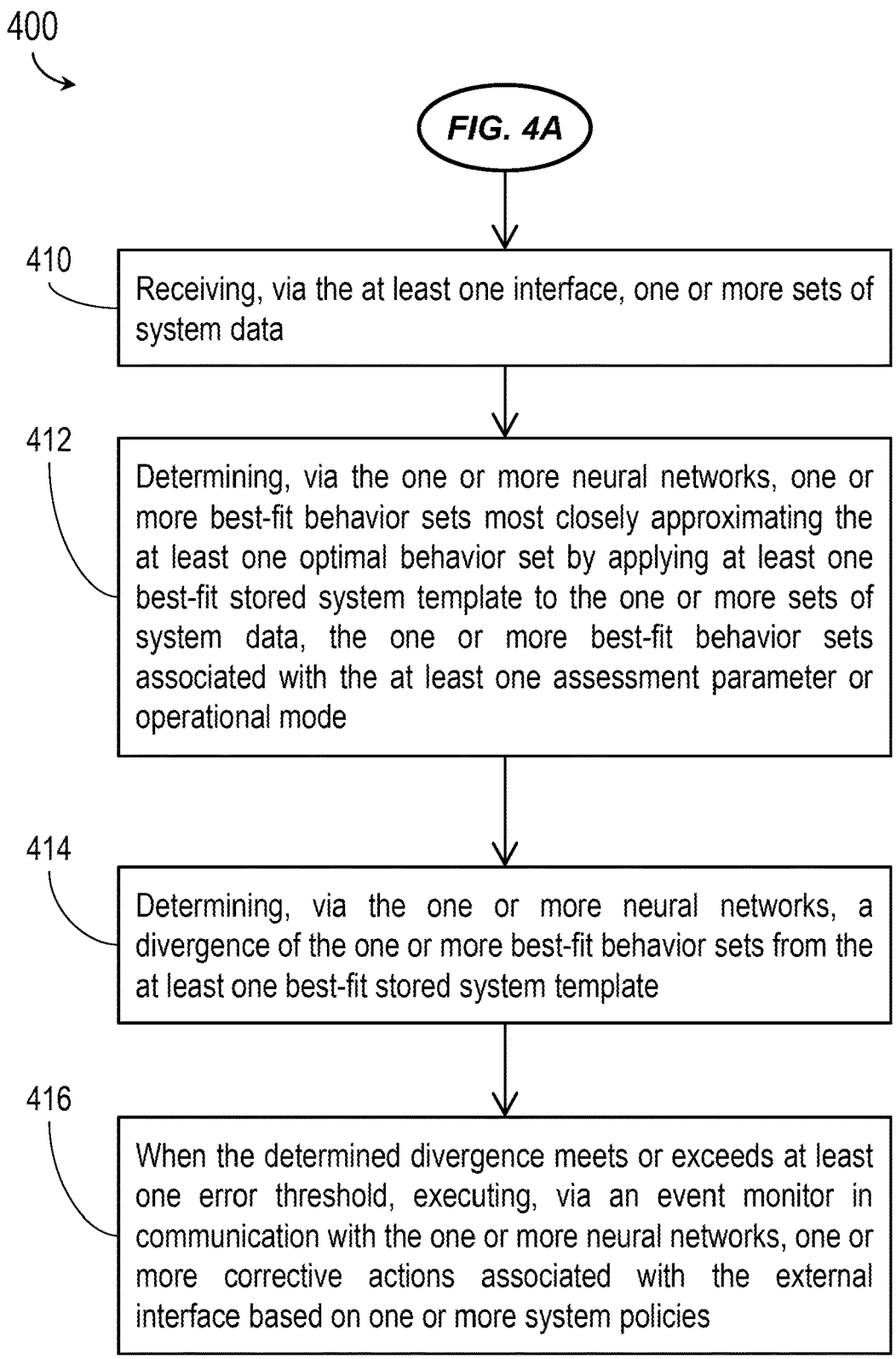

Referring also to FIG. 4B, at a step 410, the cyberintrusion detector is in host-accessible mode (e.g., in a real-time operating mode or otherwise not in training mode), monitoring exchanges of system data between the protected system and the external data sources via the interfaces.

At a step 412, for each exchange of system data, the neural networks attempt to replicate or approximate the "gold standard" optimal behavior set by applying stored system templates to the current sets of system data and observing the resulting behaviors of the interfaces (e.g., outcome sets). For example, applied behavior sets may be based on the current operational mode of the protected system. Similarly, whether the observed behaviors of the interfaces (based on a particular applied system template) is determined to be normal, abnormal, or anomalous may be at least partially based on the extent to which the application of the system template to the system data aligns with assessment parameters. The neural networks may determine a best-fit behavior set (e.g., the product of applying a best-fit stored system template or group thereof to the system data) representing an outcome set most closely approximating the optimal outcome set (e.g., when the "gold standard" optimal behavior set is applied to the system data) and therefore most indicative of normal behavior by the interfaces.

At a step 414, the neural networks assess the divergence, or best-fit error, between the determined best-fit behavior set and system policy behaviors associated with the applied best-fit system template, forwarding the determined best-fit error to an event monitor for further analysis.

At a step 416, the event monitor determines whether, according to system policies, the determined degree of divergence is sufficient (e.g., whether the best-fit behavior in light of a particular set or sets of system data is sufficiently abnormal or anomalous in light of policy behaviors associated with the applied best-fit system template as to meet or exceed threshold values set by system policies) to present a risk of cyberintrusion or cyber-attack. If the divergence from the best-fit template is indicative of sufficiently anomalous behavior by the interface (e.g., and presenting a potential risk of cyberintrusion), the event monitor may take corrective action as defined by system policies to alleviate or eliminate the risk of attack. For example, the corresponding set or sets of system data may be isolated from the protected system by the cyberintrusion monitor, or the anomalous interface may be isolated. Similarly, the cyberintrusion monitor may instead isolate one or more components of the protected system.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims.

Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A guard system for preventing cyberintrusion of a protected processing environment, the guard system comprising at least one non-transitory computer-readable medium configured for storage of instructions executable by one or more security processors, the instructions which when executed by the one or more security processors cause the one or more security processors to:
    when the guard system is in a training mode:
        generate one or more test inputs associated with at least one data exchange between the protected processing environment and one or more external data sources via at least one interface;
        observe, via one or more neural networks configured for execution on the one or more security processors, one or more training behavior sets of the at least one interface corresponding to the at least one data exchange, the one or more training behavior sets associated with at least one of 1) an assessment parameter of the data exchange or 2) an operational mode of the protected processing environment, the one or more training behavior sets including at least one optimal behavior set corresponding to a minimal threat of cyberintrusion;
        generate, via the one or more neural networks, one or more system templates based on the one or more training behavior sets;
        and
        store the one or more system templates to memory accessible to the guard system;
    and
    when the guard system is not in the training mode, for each exchange of system data between the one or more external data sources and the protected system via the at least one interface:
        determine, via the one or more neural networks, one or more best-fit behavior sets most closely approximating the at least one optimal behavior sets by applying at least one best-fit stored system template to the received system data;
        and
        determine, via the one or more neural networks, a divergence of the one or more best-fit behavior sets from the at least one best-fit stored system template;
    and
    at least one event monitor configured for execution on the one or more security processors, operatively coupled to the at least one interface and including a policy database configured for storage of one or more system policies,
        the event monitor configured to, if the determined divergence meets or exceeds a divergence threshold associated with the at least one interface, cause the one or more security processors to execute one or more corrective actions based on the one or more system policies associated with the at least one interface.

2. The guard system of claim 1, wherein the at least one assessment parameter is selected from a group including:
    a label associated with the system data;
    an address associated with the one or more external data sources;
    a periodicity of the at least one data exchange;
    or
    a dependency of the one or more external data sources.

3. The guard system of claim 1, wherein the at least one assessment parameter is associated with at least one of a target value or a threshold value.

4. The guard system of claim 1, where the one or more corrective actions are selected from a group including:
    isolating the system data;
    isolating the at least one interface from the protected system;
    or
    isolating at least one component of the protected system.

5. The guard system of claim 1, wherein:
    the protected system is embodied in a mobile platform;
    and
    the at least one operational mode includes at least one operational mode of the mobile platform.

6. The guard system of claim 1, wherein:
    the one or more observed training behavior sets are associated with first system metadata associated with at least one metadata source;
    and
    determining the one or more best-fit behavior sets includes:
        observing the one or more operating behaviors includes observing second system metadata associated with the at least one metadata source,
        and
        comparing the observed second system metadata and the first system metadata.

7. The guard system of claim 6, wherein the at least one metadata source is selected from a group including:
    a mission parameter;
    a system message received by the protected system
    user data associated with at least one user of the protected system;
    or
    a sensor in communication with the protected system.

8. The guard system of claim 1, wherein determining, via the one or more neural networks, a divergence of the one or more best-fit behavior sets from the at least one best-fit stored system template includes comparing the one or more best-fit behavior sets to one or more stored policy behaviors corresponding to the at least one best-fit stored system template.

9. A method for detecting a cyberintrusion via interfaces of a protected processing environment, the method comprising:

generating, via one or more neural networks configured to run on one or more security processors, one or more test inputs associated with at least one data exchange between a protected processing environment and one or more external data sources via at least one interface;

observing, via the one or more neural networks, one or more training behavior sets of the at least one interface corresponding to the at least one data exchange, the one or more training behavior sets associated with at least one of 1) an assessment parameter of the data exchange or 2) an operational mode of the protected processing environment, the one or more training behavior sets including at least one optimal behavior set corresponding to a minimal threat of cyberintrusion;

generating, via the one or more neural networks, one or more system templates based on the one or more training behavior sets;

storing the one or more system templates to memory accessible to the one or more neural networks;

receiving, via the at least one interface, one or more sets of system data;

determining, via the one or more neural networks, one or more best-fit behavior sets most closely approximating the at least one optimal behavior set by applying at least one best-fit stored system template to the one or more sets of system data, the one or more best-fit behavior sets associated with the at least one assessment parameter or operational mode;

determining, via the one or more neural networks, a divergence of the one or more best-fit behavior sets from the at least one best-fit stored system template; and when the determined divergence meets or exceeds at least one error threshold, executing, via an event monitor in communication with the one or more neural networks, one or more corrective actions associated with the interface based on one or more system policies.

10. The method of claim 9, wherein the at least one assessment parameter is selected from a group including:
a label associated with the one or more sets of system data;
an address associated with the one or more external data sources;
a periodicity of the one or more sets of system data;
or
a dependency of the one or more external data sources.

11. The method of claim 9, wherein the at least one assessment parameter is associated with at least one of a target value or a threshold value.

12. The method of claim 9, wherein the one or more corrective actions are selected from a group including:
isolating the one or more sets of system data;
isolating the at least one interface from the protected processing environment;
or
isolating at least one component of the protected processing environment.

13. The method of claim 9, wherein:
observing, via the one or more neural networks, one or more training behavior sets of the at least one interface corresponding to the at least one data exchange includes observing first system metadata associated with the at least one data exchange and with at least one metadata source;
and
determining, via the one or more neural networks, one or more best-fit behavior sets most closely approximating the at least one optimal behavior set includes:
observing second system metadata associated with the one or more sets of system data and with the one at least one metadata source,
and
comparing the second system metadata and the first system metadata.

14. The method of claim 13, wherein the at least one metadata source is selected from a group including:
a mission parameter;
a system message received by the protected processing environment;
user data associated with at least one user of the protected processing environment;
or
a sensor in communication with the protected system.

15. The method of claim 9, wherein determining, via the one or more neural networks, a divergence of the one or more best-fit behavior sets from the at least one best-fit stored system template includes:
comparing the one or more best-fit behavior sets to one or more stored policy behaviors corresponding to the at least one best-fit stored system template.

\* \* \* \* \*